United States Patent [19]

Spies

[11] Patent Number: 4,771,601
[45] Date of Patent: Sep. 20, 1988

[54] ROCKET DRIVE WITH AIR INTAKE

[75] Inventor: Johann Spies, Stuhr, Fed. Rep. of Germany

[73] Assignee: Erno Raumfahrttechnik GmbH, Bremen, Fed. Rep. of Germany

[21] Appl. No.: 56,568

[22] Filed: Jun. 1, 1987

[30] Foreign Application Priority Data

May 30, 1986 [DE] Fed. Rep. of Germany ....... 3617757

[51] Int. Cl.$^4$ .............................................. F02K 9/48
[52] U.S. Cl. ........................................ 60/259; 60/260; 60/270.1
[58] Field of Search ............... 60/259, 260, 257, 270.1, 60/39.33, 728, 730

[56] References Cited

U.S. PATENT DOCUMENTS

| | | | |
|---|---|---|---|
| 2,735,263 | 2/1956 | Charshafian | 60/270.1 |
| 2,883,829 | 4/1959 | Africano | 60/259 |
| 2,948,112 | 8/1960 | Smith | 60/257 |
| 2,960,834 | 11/1960 | Kirkpatrick | 60/257 |
| 3,002,340 | 10/1961 | Landerman | 60/260 |
| 3,040,519 | 6/1962 | Rae | 60/260 |
| 3,040,520 | 6/1962 | Rae | 60/260 |
| 3,561,217 | 2/1971 | Hall | 60/260 |
| 3,775,977 | 12/1973 | Builder et al. | 60/260 |

*Primary Examiner*—Donald E. Stout
*Attorney, Agent, or Firm*—Ralf H. Siegemund

[57] ABSTRACT

A rocket propulsion system working with cryogenic fuel is modified by supersonic and hypersonic flight wherein air is sucked in to be used in lieu of the oxidizer in the rocket system. Hybrid operation is provided for.

7 Claims, 1 Drawing Sheet

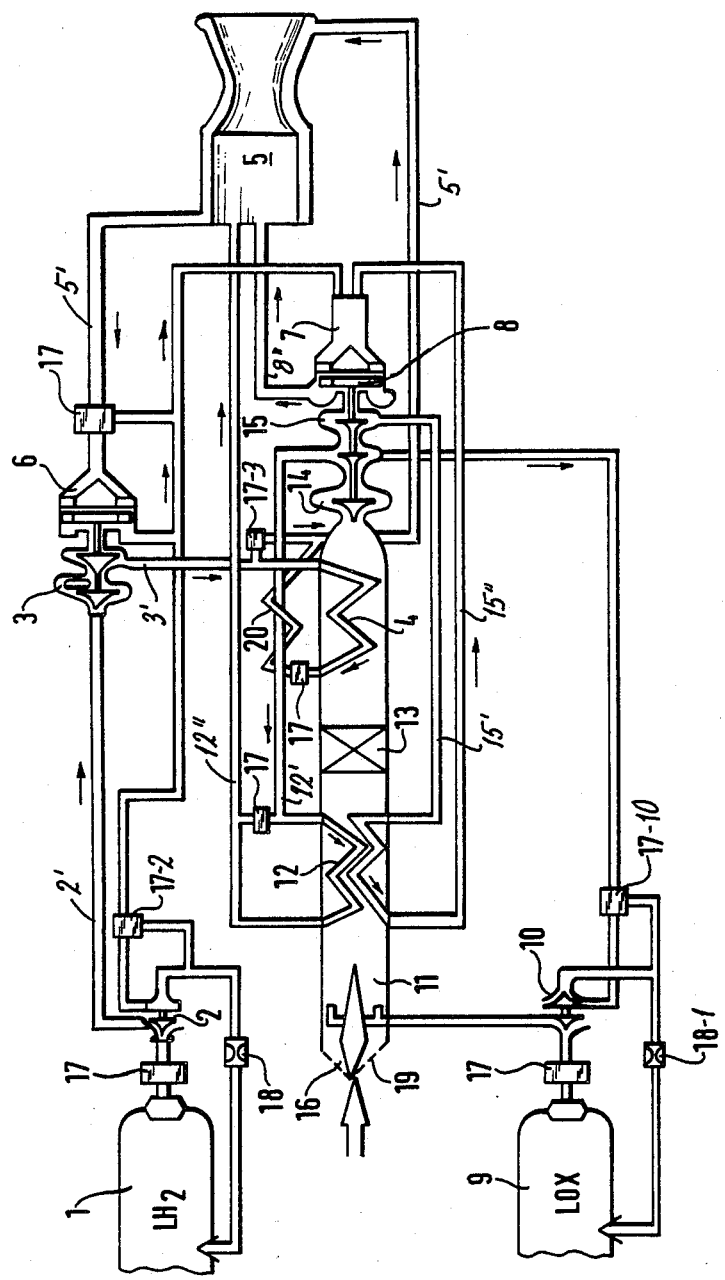

ROCKET DRIVE WITH AIR INTAKE

BACKGROUND OF THE INVENTION

The present invention relates to a rocket drive system with air intake and including cyrogenic fuels for utilization as a space vehicle carrier system, as well as for use in a supersonic and hypersonic aircraft i.e. aerodynamic flight systems.

Presently, only those kind of rocket drives are used for space vehicle carrier systems which carry along all of the fuel, as well as an oxidation medium. However, as long as the carrier is still within the atmosphere, one could use propulsion systems with air intakes just as they are used in supersonic and hypersonic aircraft, so as to take the necessary oxygen from the atmospheric environment as long as the rocket and propulsion system is, in fact, still in the atmosphere.

As stated, the presently known rocket drives and rocket propulsion systems and engines are independent from the presence or absence of air on the outside. For this reason they not only carry all of the fuel, but also all of the oxidizing medium necessary for combustion. Aside from this independence, there is a definite advantage in such a system which is launched from zero motion, zero speed condition, and that is its capability of covering the entire speed and altitude range during any mission. A single mode propulsion ensures compact design, high thrust density, such as 20–200 N/cm$^2$, and relatively low thrust specific mass, such as 1–2 kg/kN. On the other hand, all these advantages are, to a considerable extent offset by a large specific fuel consumption, such as 0.25 kg/kN.s. This fuel consumption is primarily determined by the presently preferred pairing of cryogenic fuel such as liquid hydrogen, $LH_2$, with liquid oxygen LOX, whereby simply in terms of quantity 80% is occupied by the oxidizer. Cryogenic systems of this type use approximately 50% of the entire fuel (i.e. fuel proper plus oxidizer) for the accelerated ascent through the lower, relatively dense atmosphere, until attaining speeds in the range from 1500 to 1800 m/s, which is about Mach 5–6. The remaining fuel is used to accelerate the vehicle up until attaining orbital speeds, such as 7600 m/s.

This high fuel consumption for the accelerated ascent through the lower atmosphere inevitably leads to a relatively low and poor payload-to-fuel ratio, and an overall large mass and weight on launching. The high fuel consumption requires, moreover, the installation of propulsion systems which provide very high thrust, and in spite of the relatively low thrust specific mass, they are still heavy. Therefore, for reasons of operative simplicity, safety end lower operating cost, a single stage carrier system is pushing the border of, what is technilogocally feasible, bearing in mind that the risk of developing such system is very high. Another operative disadvantage of a pure rocket propulsion carrier system is the simple fact that the system itself cannot be transferred on its own between various locations on ground, for example, between the manufacturing plant and the launch site or between landing and launching, or landing point and manufacturing facility.

Propulsion drives with air intake, generally, will take the oxygen necessary for combustion from the environment as long as a sufficient amount is available. Consequently, their fuel consumption is very low, such as 0.02 kg/kN.s. Unfortunately, the known air intake systems are disadvantaged by large dimensions, relatively low thrust density, and relatively large thrust specific mass such as 10 kg/kN, while, of course, in addition, environmental air independent rocket facilities still have to be provided for to provide for the propulsion once the vehicle has left the air.

Among the known air intake type jet propulsions are, for example, the usual turbine jet propulsion systems, which are used in the high subsonic and moderate supersonic speed range. Conventional ram jets with subsonic combustion are used in the higher supersonic range, while the very high supersonic and hypersonic range uses ram jets with supersonic combustion and supersonic through-flow, also called SCRAMJETS. Finally, a multiple of so-called combination propulsions systems are known, such as turbo ram jets, turbo rocket drives, shrouded ram jet rocket drives, and so forth. In the so-called turbine air jet propulsion system, a turbine driven compressor causes air to be sucked into the combustion chamber. Such drives can be used right in the beginning for a takeoff from a standing position, with and without after burners. However, their thrust density is quite low and their thrust specific mass is much too large, at the present the known values are about 10 kg/kN. Moreover, the range of such turbojet drive and propulsion system is quite limited owing to the compression problems, so that, in fact, only a moderate to lower supersonic range can only be covered.

Ram jets have a diffuser which provides for the compression of captured air and feeds it to the combustion. Such jet propulsion system are incapable of providing adequate thrust from a standstill position. Moroever, they need a rocket assist drive or a turbojet drive just in order to provide for an initial accelleration, at least up to a speed in which the ram jet effect can be utilized. With increasing Mach number the ram temperature of the air limits the range of conventional ram jets with subsonic combustion to about Mach 7. Higher speeds require either a rocket assist drive or a transition to ram jet drive system with supersonic combustion. This type of propulsion system is known as SCRAMJET, and it avoids thermal problems resulting from the significant decelleration of air from hypersonic speed to subsonic speed. In addition, the significant static pressure losses in such a case are avoided. These SCRAMJETS avoid these problems specifically in that the hypersonic air flow is decellerated in the intake diffuser only to a moderate extent, down to a moderate supersonic speed. Realization and testing of a SCRAMJET drive, however, is an extremely expensive and risky development. Owing to the power limits of wind tunnels which limits are based on physical and technical considerations, it is extremely difficult to test any component in the hypersonic range.

Conventional ram jets with subsonic combustion, as well as SCRAMJETS, offer the advantage that within a quite large range of Mach number the specific fuel consumption remains low. Unfortunately, the thrust density is on the average also quite low, while the thrust specific mass is still relatively high. The drawback of the inability to accellerate from standstill is met in any other conceptualization by integrating these propulsion systems with a rocket drive which provides an initial acceleration until the ram jet or SCRAMJET operation can take over, while, finally, of course, the carrier system has to be accelerated to orbital speed by the rocket outside of the atmosphere. Particularly for single stage space vehicle carriers, one cannot, on the other hand, use different kinds of propulsion engines which work only part time and during certain phases, because any drive aggregate after its operating phase is just ballast which reduces the payload capacity of the carrier system.

Calculations have shown, for example, that a single stage carrier system with a cryogenic rocket drive and having been accellerated up to about 5-6 Mach, can, in fact, be brought into orbit, provided this drive aggregate which provided the initial accelleration will not consume more than 20% of the entire fuel that is needed, and if the additional components used for air intake operation, will not cause the thrust specific mass to exceed about 6 kg/kN.

DESCRIPTION OF THE INVENTION

It is an object of the present invention to provide a new and improved rocket propulsion system with air intake which avoids the various drive specific drawbacks outlined above but permits retention of the advantage of a pure rocket drive, while combining therewith the advantages turbo air jets and ram jets propulsion systems have.

In accordance with the preferred embodiment of the present invention, it is suggested to provide a particular cryogenic twocomponent fuel system, preferably $LH_2$ and LOX, wherein the elements of three conventional jet propulsion systems, namely rocket drive systems, turbodrive systems and ram jets, are combined in a single drive aggregate under utilization of conventional process elements, permitting propulsion with air intake, as well as without, and also permitting hybrid operation and transition from one mode to another.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

The FIGURE shows a block diagram of a propulsion system in accordance with the preferred embodiment of the present invention for practicing the best mode thereof.

Proceeding now to the detailed description of the drawing, pure air intake operation is established by closing a discharge control valve 17 for an oxidizer tank 9 so that a LOX pump 10 ceases to operate; an oxidizer injector 11 is also closed, while the optional air intake flaps 19 are open. Air with a thermodynamic state (enthalpy) that depends upon Mach number and elevation, i.e. air pressure, temperature, and water vapor content, may enter through these flaps 19 when open, and passes through the air intake 16, preferably constructed as a multiple shock diffuser. This way external air enters the aggregate and passes the oxidizer injector 11, and flows through a pre-cooler 12 for a cool down. Owing to appropriate dimensioning, as well as through control of the coolant flow, one obtains a very decisive pre-cooling, particularly on account of the content of the water vapor content, which is significant in low altitudes. The cooling causes the air to drop below the dew point of water vapor.

Downstream of the cooling (12) a water precipitator 13 is provided to dry the pre-cooled air prior to flowing into and through the cryogenic cooler 4, which is also passed through by cryogenic fuel. Here then, the air is cooled as much as possible, but not below its dew point until reaching the principle compressor 14. Owing to this very strong cooling of the air, one reduces the power requirements, stage number, dimensions, and mass of the two compressors 14 and 15. In addition, one obtains, so to speak, a decoupling of the operation of these parts from the actual aircraft speed, so that that speed will have little if any influence upon the power and operation of this compressor group.

The air flow is biparted downstream from the principle compressor 14. The major portion of the air is passed via a duct 12' through the above-mentioned regenerative pre-cooler 12 and from there via conduit 12" directly to the combustion chamber 5. A smaller portion of compressed air from compressor 14 is fed to the high compression stage 15, and the now highly pressurized air is then also passed through the regenerative pre-cooler, conduit 15' and from 12 that air portion flows through conduit 15" to the high pressure gas generator 7.

The fuel stored in tank 1, preferably hydrogen, is fed by means of a first, pre-stage pump 2, having its own turbine, to a principal pump 3 through an appropriate conduit system 2' and pump 3 advances the fuel at high pressure through conduit 3' to and through the cryogenic cooler 4 and from there through the cooling jacket (5') of the combustion chamber 5 to the fuel turbine 6.

The fuel turbine feeds a small amount of fuel to the pump 2 via valve 17-2 for driving same. The uncombusted fuel that just drives the turbine of the pump 2 is fed back via a control valve 18 to tank 1. The fuel continues through the turbine 6 to the high pressure gas generator 7, wherein the gaseous fuel is combusted under utilization of the partial air stream (conduit 15") that is also fed to that generator 7. The mixing ratio of operation in the high pressure gas generator 7 is selected so that the gas temperature will not exceed the permissible turbine inlet temperature. The precombusted but fuel rich gas drives the main turbine 8 and leaves the turbine 8 (conduit 8') for the combustion chamber 5, wherein it is combined with the larger partial air stream (conduit 12") that was fed through the regenerative pre-cooler 12. Following combustion in chamber 5, the combustion products are expanded by and within the main thrust producing nozzle of that chamber 5.

The chosen arrangement of pre- and principal cooler relieves, on one hand, the cryogenic cooler 4 to some extent, and, therefore, takes care of adequate cooling of the combustion chamber 5. On the other hand, this two stage cooling arrangement permits the utilization of the regenerator pre-cooler 12 in the particular arrangement to obtain drying of the air whenever there is an air intake operation by the precipitator 13. On the other hand this pre-cooler 12 makes sure that upon feeding back of the compression heat produced by and in the compressors 14 and 15 a pure rocket drive can obtain upon evaporation of the oxidizer fed into the system via the oxidizer injector 11, whenever that kind of operation is desired. The oxidizer is preferably, as stated, liquid oxygen. Effectiveness of the regenerating pre-cooler 12 is, moreover enhanced and increased further by providing upstream a tubular heat exchanger 20 for the air that is fed from compressor 14 to cooler 12 to be in heat exchange with the fuel that is pumped by pump 3 and after having passed through cryogenic cooler 4.

Turning now to the pure rocket drive operation, one will close the air intake flaps 19, while the valve 17 at the oxidizer tank 9 is opened, so is the injector 11. The pump 10 is driven by its own turbine which receives pressurized gas via a valve 17-10 from the compressor 14. A return path line controlled by a control valve 181 returns the spent oxygen to the tank 9. The oxidizer pump 10 feeds oxidizer medium taken out of the tank 9 through and into the oxidizer injector 11 to flow to and through the regenerating precooler 12. This cooler 12 is now operated as evaporator for the oxidizing fluid. The evaporated oxygen just passes through the precipitator 13, which does not perform any function at this point because there is no water vapor in the tank 9. The oxidizing medium passes through the cryogenic cooler 4 however that cooler as well as the tubular heat exchanger 20 will not be flown through by coolant in order to avoid undesired recondensation (formation of ice) in this mode of operation which is, therefore, passing through a by-pass line by operation of valve 17-3. Further processing of the oxidizer and of the fuel is the same as the previous operation described with reference to air intake mode of operation.

For purposes of providing for a transition from air intake to pure rocket propulsion, it is suggested to provide a hybrid mode of operation, wherein the drive aggregate receives oxygen from the tank 9 as well as air that is being sucked in through the open flaps 19. This hybrid operation has the following advantages. First of all, by providing for this hybrid operation in the first place, it is possible to provide for a smooth transition of one mode of operation to the other i.e. for the earlier described mode of air intake operation to the rocket mode without any abrupt changeover. Moreover, this way, one can extend the operation which utilizes external air towards higher speeds and higher altitudes simply because there is no exclusive reliance on the amount of air being sucked in, but whatever air can be used is being used, and that, of course, reduces the amount of oxidizer in the tank 9, i.e. the dimensions, weight, etc. of the tank 9, which ultimately is, of course, immediately and directly beneficial for increasing the payload.

It is a particular advantageous form of practicing the invention, to replace the regenerative pre-cooler 12 by a recuperative pre-cooler which is somewhat more compact and, therefor, quite possibly of lighter weight. Another alternative is that in lieu of the principle compressor 14, and of the main turbine 8, one uses a pressure wave compressor.

The invention is not limited to the embodiments described above, but all changes and modifications thereof, not constituting departures from the spirit and scope of the invention are intended to be included.

I claim:

1. Rocket system with air intake for the propulsion of a space vehicle carrier for use in and outside of the atmosphere, comprising:

a fuel tank; an oxidizer tank; an air intake a main combustion chamber with ejection nozzle; a pre-cooler; a fuel turbine;

means connected to the air intake for air intake operation and feeding said air to the pre-cooler for reducing the heat content thereof, owing to intake compression;

a water precipitator disposed downstream from the precooler for drying the air;

a cryogenic cooler connected to the water precipitator for cooling the air to a temperature not below the liquification temperature of air;

a principal compressor connected to the cryogenic cooler to receive therefrom cooled air;

a principal turbine connected to drive the principal compressor;

a flow splitting means connected to the principle compressor and providing a larger portion of the compressed air to the precooler; a high pressure compressor connected to receive a smaller portion of the air from the principal compressor;

a means connected for feeding the output of the high pressure compressor also through the pre-cooler;

a high pressure gas generator connected for receiving high pressurized air from the high pressure compressor, after having passed through the pre-cooler; the high pressure gas generator further connected to drive the principal turbine;

means for feeding combustion fuel from said fuel tank through a valve, a fuel pump, the cryogenic cooler, a cooling jacket of the main combustion chamber; a fuel turbine which drives said fuel pump, then to the high pressure generator, wherein the air fuel mixture is pre- and partially combusted thereby causing the high pressure generator to drive the principal turbine;

means for feeding the partially combusted fuel/air mixture through the principal turbine to the main combustion chamber;

means connected for feeding the larger portion of pre-compressed air from the pre-cooler to the combustion chamber for obtaining combustion therein and jet flow ejection from the nozzle;

flap means for closing said air intake;

means connected for feeding oxidizer medium from said oxidizer tank via a valve and a pump to an oxidizer injector, disposed adjacent to said air intake means so that the oxidizer flows through the pre-cooler, the cryogenic cooler and into the principal compressor;

means including said fuel feeding means for having the fuel by-pass said cryogenic cooler; and means for providing hybrid operation in which said flap is open and oxidizer is taken from said tank and mixed with said air upstream from the pre-cooler.

2. System as in claim 1 including another fuel pump fluidly connected to said turbine which extracts therefrom a small portion of the fuel for being driven.

3. System as in claim 1 and including another heat exchanger included in the flow splitting means for precooling a connection thereof between the principal compressor and the regenerative cooler.

4. System as in claim 2 including means for returning the small fuel portion to the fuel tank.

5. System as in claim 1 including means for feeding a small amount of oxidizer to the oxidizer pump for driving the same.

6. System as in claim 5 and including means for returning the small amount of oxidizer to the oxidizer tank.

7. Rocket system with air intake for the propulsion of a space vehicle carrier for use in and outside of the atmosphere, comprising:

a fuel tank; an oxidizer tank; an air intake; a main combustion chamber with ejection nozzle; a pre-cooler; a fuel turbine;

means connected to the air intake for air intake operation and feeding said air to the pre-cooler for reducing the heat content thereof, owing to intake compression;

a water precipitator disposed downstream from the pre-cooler for drying the air;

a cryogenic cooler connected to the water precipitator for cooling the air to a temperature not below the liquification temperature of air;

air compression means connected to the cryogenic cooler to receive therefrom cooled air and providing compression thereof;

a flow splitting means connected to said air compression means and providing a larger portion of the compressed air to the precooler; a high pressure compressor connected to receive a smaller portion of the air from the air compression means;

a means connected for feeding the output of the high pressure compressor also through the pre-cooler;

a high pressure gas generator connected for receiving high pressurized air from the high pressure compressor, after having passed through the pre-cooler;

means for feeding combustion fuel from said fuel tank through a valve, a fuel pump, the cryogenic cooler, a cooling jacket of the main combustion chamber; a fuel turbine which drives said fuel pump, then to the high pressure generator, wherein the air fuel mixture is pre- and partially combusted thereby causing the high pressure generator to drive the air compression means;

means for feeding the partially combusted fuel/air mixture to the main combustion chamber;

means connected for feeding the larger portion of pre-compressed air from the pre-cooler to the combustion chamber for obtaining combustion therein and jet flow ejection from the nozzle;

flap means for closing said air intake;

means connected for feeding oxidizer medium from said oxidizer tank via a valve and a pump to an oxidizer injector, disposed adjacent to said air intake means so that the oxidizer flows through the pre-cooler, the cryogenic cooler and into the air compression means;

means including said fuel feeding means for having the fuel by-pass said cryogenic cooler; and means for providing hybrid operation in which said flap is open and oxidizer is taken from said tank and mixed with said air upstream from the pre-cooler.

* * * * *